United States Patent
Thazhathekalam et al.

(10) Patent No.: US 10,621,627 B2
(45) Date of Patent: Apr. 14, 2020

(54) RUNNING CLIENT EXPERIMENTS BASED ON SERVER-SIDE USER SEGMENT DATA

(71) Applicant: Microsoft Technology Licensing, LLC, Redmond, WA (US)

(72) Inventors: Krishnan Thazhathekalam, Bellevue, WA (US); Mahaveer Kothari, Redmond, WA (US); Sebastian Kohlmeier, Mountlake Terrace, WA (US); Jorge H. Banuelos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 15/586,808

(22) Filed: May 4, 2017

(65) Prior Publication Data

US 2018/0322539 A1 Nov. 8, 2018

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0243* (2013.01); *G06Q 30/0267* (2013.01)

(58) Field of Classification Search
None
See application file for complete search history.

(56) References Cited

U.S. PATENT DOCUMENTS

| | | | |
|---|---|---|---|
| 8,495,204 B2 | 7/2013 | Shin et al. | |
| 8,898,178 B2 | 11/2014 | Kyomasu et al. | |
| 9,268,663 B1 | 2/2016 | Siddiqui et al. | |
| 9,305,322 B2 | 4/2016 | Johnson et al. | |
| 9,336,126 B1 | 5/2016 | Masse et al. | |
| 9,460,449 B2 | 10/2016 | Juda et al. | |
| 10,110,675 B1* | 10/2018 | Miller | H04L 67/06 |
| 2003/0224792 A1* | 12/2003 | Verma | H04L 29/06 455/436 |

(Continued)

OTHER PUBLICATIONS

"Google Analytics Integration", https://segment.com/docs/integrations/google-analytics/, Retrieved on: Dec. 14, 2016, pages.

(Continued)

*Primary Examiner* — Matthew T Sittner
(74) *Attorney, Agent, or Firm* — Schwegman Lundberg & Woessner, P.A.

(57) ABSTRACT

A machine may be configured to assign digital content campaign treatments to targets of a digital content campaign, at a server. For example, the machine access data pertaining to one or more characteristics of an application. The application is hosted on a client device. The data is stored at a server-side database. The machine determines that the one or more characteristics of the application match one or more targeting criteria associated with a digital content campaign. The digital content campaign includes a plurality of flights of a digital content item. The machine assigns a flight of the plurality of flights of the digital content campaign to the client device. The flight identifies a variant of the digital content item. The machine transmits a communication to the client device via a network. The communication includes a flight identifier associated with the flight.

17 Claims, 9 Drawing Sheets

(56) References Cited

U.S. PATENT DOCUMENTS

| | | | |
|---|---|---|---|
| 2010/0174655 A1* | 7/2010 | Butler | G06Q 30/02 705/80 |
| 2011/0029373 A1* | 2/2011 | Steelberg | G06Q 30/02 705/14.41 |
| 2011/0225026 A1* | 9/2011 | Ketchum | G06Q 30/02 705/14.4 |
| 2011/0238485 A1* | 9/2011 | Haumont | G06Q 30/02 705/14.41 |
| 2011/0246267 A1* | 10/2011 | Williams | G06Q 30/0255 705/14.4 |
| 2011/0246310 A1* | 10/2011 | Buchalter | G06Q 30/0275 705/14.71 |
| 2011/0246511 A1 | 10/2011 | Smith et al. | |
| 2012/0041816 A1* | 2/2012 | Buchalter | G06Q 30/02 705/14.41 |
| 2012/0136728 A1* | 5/2012 | Hsiung | G06Q 30/0275 705/14.71 |
| 2012/0323998 A1* | 12/2012 | Schoen | G06Q 30/0254 709/204 |
| 2013/0018896 A1* | 1/2013 | Fleischman | G06Q 50/01 707/748 |
| 2013/0144712 A1* | 6/2013 | Ruarte | G06Q 30/0277 705/14.45 |
| 2014/0012659 A1* | 1/2014 | Yan | G06Q 30/0241 705/14.42 |
| 2014/0046777 A1* | 2/2014 | Markey | G06Q 30/0269 705/14.66 |
| 2014/0304069 A1* | 10/2014 | Lacey | G06Q 30/0249 705/14.48 |
| 2014/0324567 A1* | 10/2014 | Saldanha | G06Q 30/0242 705/14.41 |
| 2014/0337147 A1* | 11/2014 | DaSilva | G06Q 30/0241 705/14.73 |
| 2015/0025962 A1* | 1/2015 | Becket | G06Q 30/0277 705/14.48 |
| 2015/0095166 A1* | 4/2015 | Sweeney | G06Q 30/08 705/14.71 |
| 2015/0121418 A1* | 4/2015 | Jain | H04N 21/812 725/32 |
| 2015/0149087 A1* | 5/2015 | Cohen | G06Q 50/30 701/522 |
| 2015/0181287 A1* | 6/2015 | White | H04N 21/4331 725/22 |
| 2015/0358766 A1* | 12/2015 | McDevitt | G06Q 30/0261 705/14.58 |
| 2016/0005077 A1* | 1/2016 | McDevitt | G06Q 30/0208 705/14.58 |
| 2016/0019595 A1* | 1/2016 | Wu | G06Q 30/0239 705/14.66 |
| 2016/0063568 A1* | 3/2016 | Brill | G06Q 30/0269 705/14.66 |
| 2016/0071168 A1* | 3/2016 | Buchalter | G06Q 30/0255 705/14.53 |
| 2016/0247201 A1* | 8/2016 | Pool | G06Q 30/0255 |
| 2016/0253683 A1 | 9/2016 | Gui et al. | |
| 2016/0253764 A1 | 9/2016 | Sinno et al. | |
| 2016/0292729 A1* | 10/2016 | Grunewald | G06Q 30/0255 |
| 2016/0300265 A1* | 10/2016 | Goyal | G06Q 30/0257 |
| 2016/0328484 A1* | 11/2016 | Temby | G06F 16/29 |
| 2016/0353258 A1* | 12/2016 | Stuntebeck | H04W 4/14 |
| 2016/0359702 A1* | 12/2016 | Besehanic | H04L 43/06 |
| 2017/0011424 A1* | 1/2017 | Abou-Rizk | G06Q 30/0261 |
| 2017/0132658 A1* | 5/2017 | Luo | G06Q 30/0246 |
| 2018/0102947 A1* | 4/2018 | Bhaya | H04L 43/10 |
| 2018/0150856 A1* | 5/2018 | Zhu | G06Q 30/0204 |
| 2018/0322539 A1* | 11/2018 | Thazhathekalam | G06Q 30/0277 |
| 2019/0205919 A1* | 7/2019 | Goksel | G06N 20/10 |

OTHER PUBLICATIONS

"Phased rollouts for your iOS or Android App", https://help.optimizely.com/Ideate_and_Hypothesize/Phased_rollouts_for_your_iOS_or_Android_App, Retrieved on: Dec. 14, 2016, 18 pages.

"Reallocate Traffic", http://docs.split.io/docs/reallocate-traffic, Retrieved on: Dec. 14, 2016, 2 pages.

"IBM Knowledge Center", http://www.ibm.com/support/knowledgecenter/SSZLC2_7.0.0/com.ibm.commerce.management-center.doc/concepts/csbsegover.htm, Retrieved on: Dec. 14, 2016, 5 pages.

"User segmentation in SharePoint 2013", http://web.archive.org/web/20131130162700/http:/msdn.microsoft.com/en-us/library/office/jj870831.aspx, Published on: Nov. 30, 2013, 4 pages.

"Managing Computer Groups", http://web.archive.org/web/20111029064022/http:/technet.microsoft.com/en-us/library/cc720450(v=WS.10).aspx, Published on: Oct. 29, 2011, 3 pages.

* cited by examiner

RUNNING CLIENT EXPERIMENTS BASED ON SERVER-SIDE USER SEGMENT DATA

TECHNICAL FIELD

The present application relates generally, but without limitation, to systems, methods, and computer program products for server-side assigning of digital content campaign treatments to targets of a digital content campaign, and execution of client experiments based on server-side user segment data.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In some example embodiments, digital content campaigns are created to facilitate the delivery of digital content items to client devices in client-server systems. In some instances, a digital content campaign may be an A/B experimentation that tests the responses of two different audiences to two variants (e.g., variations, treatments, or flights) of a digital content item, such as a webpage, a message, or a feature of a software application, to determine which variant performs better according to certain requirements of the A/B experimentation.

According to various example embodiments, a Flight Assignment Service hosted on a server may assign (e.g., associate) a flight identifier of a particular flight to one or more targets (e.g., a client device, a user, a client tool, a client application, etc.). The Flight Assignment Service may also transmit (e.g., send, communicate, etc.) the flight identifier to one or more client devices.

A User Segment and Digital Content Campaign Service hosted on a server may split a user base associated with a software application into two or more user segments. In various example embodiments, the User Segment and Digital Content Service identifies members of certain user segments (e.g., client devices, users associated with client devices, etc.) from a user base based on the members fitting certain criteria, and stores data pertaining to the user segments in one or more user tables of a database. Examples of criteria are users who have not used a mobile application, users who have used a mobile application, users whose subscription is going to expire, etc. The User Segment and Digital Content Campaign Service may assign (e.g., associate) a flight identifier of a particular flight to a user segment. The association between the flight identifier and the user segment may indicate that the client devices (or the users associated with the client devices) should be exposed to the particular treatment identified by the flight identifier.

In various example embodiments, the Flight Assignment Service and the User Segment and Digital Content Campaign Service do not communicate with each other. For example, the Flight Assignment Service and the User Segment and Digital Content Campaign Service may be hosted on different servers. According to another example, the Flight Assignment Service and the User Segment and Digital Content Campaign Service may be hosted on different virtual machines associated with a server. A client may perform a synchronization between the Flight Assignment Service and a User Segment and Digital Content Campaign Service to obtain the digital content associated with the flight identifier assigned to it by the Flight Assignment Service. The obtaining of the digital content may be based on a determination that the client meets certain criteria associated with the digital content campaign. For instance, one criterion is whether the client is included in user segment.

In some example embodiments, upon receiving a flight identifier from the Flight Assignment Service, a client device transmits the flight identifier to the User Segment and Digital Content Campaign Service. Based on the flight identifier, the User Segment and Digital Content Campaign Service determines whether the client device (or the user associated with the client devices) is included in a user segment. If the client device (or the user associated with the client devices) is included in the user segment, the User Segment and Digital Content Campaign Service communicates that the client device (or the user associated with the client devices) is included in the user segment to the client device. The User Segment and Digital Content Campaign Service may also, in some instances, transmit the flight (e.g., a particular variation of the digital content item) associated with the flight identifier to the client device.

BACKGROUND

The practice of A/B experimentation, also known as "A/B testing" or "split testing," is a practice for making improvements to webpages and other online content. A/B experimentation typically involves preparing two or more versions (also known as variants, or treatments) of a piece of online content, such as a webpage, a landing page, an online advertisement, etc., and providing them to separate audiences to determine which variant performs better with respect to a calculable metric.

BRIEF DESCRIPTION OF THE DRAWINGS

Some embodiments are illustrated by way of example and not limitation in the figures of the accompanying drawings, in which.

DETAILED DESCRIPTION

Figure 1:
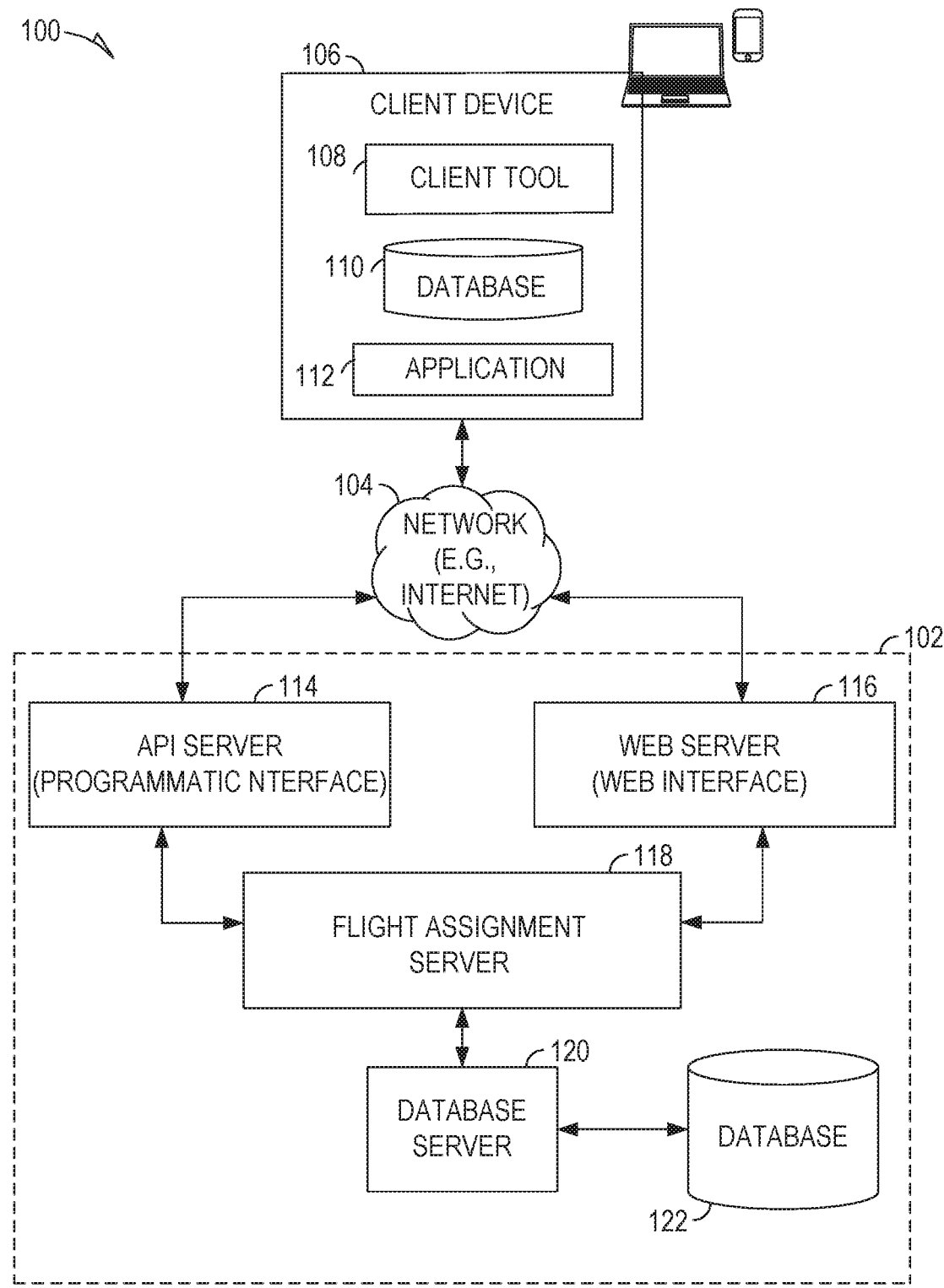
FIG. 1 is a network diagram illustrating a client-server system, according to some example embodiments.

Example methods and systems for server-side assigning of digital content campaign treatments to targets of a digital content campaign are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

In some example embodiments, digital content campaigns are created to facilitate the delivery of digital content items to client devices in client-server systems. In some instances, a digital content campaign may be an A/B experimentation that tests the responses of two different audiences to two variants (e.g., variations, treatments, or flights) of a digital content item, such as a webpage, a message, or a feature of a software application, to determine which variant performs better according to certain requirements of the A/B experimentation.

According to various example embodiments, a system may assign, at a server, two or more treatments associated with an experiment (e.g., a digital content campaign) to clients who are targets of the experiment and are included in a user segment, and may execute the experiment on the clients based on the server-side user segment data. The system, in some instances, is distributed among a plurality of servers. The system may host the Flight Assignment Service and the User Segment and Digital Content Campaign Service. A benefit of the system may be utilizing independent entities, such as the Flight Assignment Service and the User Segment and Digital Content Campaign Service, to perform user-segment-based experiments, wherein two or more variants of a digital content campaign are exposed to a given user segment, and resulting data associated with the two or more variants is analyzed to determine which variant is (or performs) better for that user segment.

In some example embodiments, the Flight Assignment Service and the User Segment and Digital Content Campaign Service do not communicate (e.g., do not exchange data) with each other. The Flight Assignment Service and the User Segment and Digital Content Campaign Service may communicate with (e.g., transmit data to, or receive data from) the clients that are targets of an experimentation.

In some instances, a digital content campaign may include determining that the licenses (or subscriptions) of certain users of a user base for a product or service (e.g., a software application) are about to expire, or that there is a high likelihood that the certain users may cancel the subscriptions. A feature of a product or service may be disabled for a client device based on a type of subscription or license associated with the client device for the product or service. Some users may be motivated to renew their subscription if a particular, previously disabled feature of the product or service (e.g., a feature of an application) is enabled in the product or service. The digital content campaign may facilitate the enabling of certain previously disabled features of the product or service for use by certain users in order to entice the certain users to renew their licenses (or subscriptions).

According to various example embodiments, a flight assignment and segmentation server may access cloud-side (e.g., server-side) data pertaining to a particular client device, to a software application hosted on the particular client device, or to a user associated with the particular client device. Based on this cloud-side data, the flight assignment and segmentation server may determine one or more additional, previously disabled features of the product or service that are appropriate to be enabled for use by the particular client device or the user associated with the particular client device. The flight assignment and segmentation server may facilitate the enabling of the additional features on the particular client device associated with the user. The enabling of the additional features of the product or service may entice the user to continue or renew the subscription.

The determination of whether a previously disabled feature of the product or service is appropriate to be enabled for use by the particular client device or the user may be based on the probability that the user will continue the user's subscription based on the newly-enabled features of the product or service. The probability that the user will continue the user's subscription may be determined based on the cloud-side data pertaining to the one or more client devices associated with the user, to the software application hosted on the one or more client devices associated with the user, or to the user associated with the one or more client devices. For example, to determine whether to enable an additional feature of a mobile application on the mobile device of a user, the flight assignment and segmentation server may consider the number of client devices associated with the user, the types of client devices, the operating systems of the client devices, the frequency of usage by the user of any mobile device associated with the user, the types of mobile applications hosted on the mobile devices associated with the user, the types of activities by the user via the client devices associated with the user, demographic data pertaining to the user, a location of the user, etc.

In some example embodiments, a flight assignment and segmentation system, at a server, accesses data pertaining to one or more characteristics of an application. The application may be hosted on a client device. The data pertaining to the one or more characteristics of the application may be stored at a server-side database. In some instances, the data pertaining to the one or more characteristics of the application includes at least one of a type of the application, a frequency of use, by a user associated with the client device, of one or more features of the application on one or more client devices including the client device, or a lack of use, by the user associated with the client device, of the one or more features of the application on the one or more client devices including the client device.

The flight assignment and segmentation system may determine that the one or more characteristics of the application match one or more targeting criteria associated with a digital content campaign. The digital content campaign may include a plurality of flights of a digital content item. The flight assignment and segmentation system may assign a flight of the plurality of flights of the digital content campaign to the client device (or to a group of client devices, or to a user segment of a user base of the application). The flight may identify a particular variant (e.g., variation, treatment, etc.) of the digital content item.

For example, a digital content campaign may be developed to motivate users of a product or service, whose subscription to the product or service is about to expire, to renew their subscription. The digital content campaign may include two flights: a first flight to enable a first feature of the product or service, and a second flight to enable a second feature of the product or service. The first flight may be assigned to a first user segment (e.g., a first group of users whose subscription is about to expire), and the second flight may be assigned to a second user segment (e.g., a second group of users whose subscription is about to expire).

The flight assignment and segmentation system may transmit a communication to the client device via a network. The communication may include a flight identifier associated with the flight. In some example embodiments, the flight assignment and segmentation system analyzes a user response to the digital content campaign based on accessing a log generated at the client device, wherein the log tracks actions by the user in response to a particular flight of the digital content (e.g., the enabling of a particular feature of the application on the client device).

In various example embodiments, the digital content campaign includes an experimentation, the plurality of flights include a plurality of treatments associated with the experimentation, and the flight includes a particular treatment of the experimentation. The particular treatment may be assigned to the client device based on a criterion associated with at least one of the client device or a user associated with the client device. The experimentation may include an A/B test. The A/B test may include a plurality of A/B treatments. Each of the plurality of the A/B treatments may be assigned to a particular group of users.

In certain example embodiments, the digital content item includes a feature of the application. A particular flight may indicate whether to enable or not enable the feature of the application on the client devices that are assigned the particular flight. In some example embodiments, the digital content item includes a message for display in a user interface associated with the application. A particular flight may indicate whether to display or not to display the message in a user interface on the client devices that are assigned the particular flight.

According to various example embodiments, a client device tool (or a client device system, or a client device application), at run time of an application hosted on a client device, issues a query from the client device to a flight assignment and segmentation server via a network. The query may pertain to a digital content campaign. The digital content campaign may include a plurality of flights of a digital content item.

The client device tool may receive a response to the query from the flight assignment and segmentation server. The response to the query may include a flight identifier associated with a flight of the plurality of flights of the digital content item. In some instances, the flight is assigned by the flight assignment and segmentation server to a client device (or to a group of client device, or to a user segment of a user base of the application) based on matching data pertaining to the application hosted on the client device, and one or more targeting criteria associated with the digital content campaign.

Based on the flight identifier, the client device tool may access the flight from the flight assignment and segmentation server. The flight assignment and segmentation server (or a database associated with the flight assignment and segmentation server) may store flights of the digital content item. The client device tool may perform a particular action pertaining to the application based on the flight accessed front the flight assignment and segmentation server.

In some example embodiments, the digital content item is a message pertaining to the application hosted on the client device, and the performing of the particular action includes displaying the message pertaining to the application hosted on the client device. In certain example embodiments, the digital content item is a feature of the application hosted on the client device, and the performing of the particular action includes enabling the feature of the application on the client device. According to some example embodiments, the issuing of the query includes, at the client device, issuing a network call (e.g., a first network call) to the server. The network call may include a request to get the flight identifier from the server.

In some example embodiments, the accessing of the flight from the server includes, at the client device, issuing a network call (e.g., a second network call) to the server. The network call may include a request to get the flight based on the flight identifier. The flight identifier may, in some instances, be included in the network call to the server. In response to the network call, the client device tool may receive the flight from the server, or an indicator of a location where the flight is stored in a database and from where the flight can be accessed.

In certain example embodiments, the performing of the particular action pertaining to the application includes displaying a call to action in a user interface of the client device. The call to action may invite a user associated with the client device to take an action pertaining to the application. In some instances, the call to action may include an invitation to renew a subscription. In some example embodiments, the client device tool generates a log pertaining to one or more actions, by the user, regarding the call to action. The log may be accessed by the flight assignment and segmentation system, and the log data may be analyzed to determine the effectiveness of the flight in accomplishing the goals of the digital content campaign (e.g., inciting the user to continue or renew a subscription)

FIG. 1 is a network diagram depicting a client-server system 100, within which various example embodiments may be deployed. A client device 106, hereinafter also "client machine," may connect via a network 104 (e.g., the Internet or Wide Area Network (WAN)) to a networked system 102. One or more client tools may be stored on the client device 110. FIG. 1 illustrates, for example, client tool 108 executing on the client device 106. The client device 106 may be associated with a user of one or more applications (e.g., application 112) hosted on the client device 106.

The client tool 108 may, for example, be a software program that facilitates the identifying of an assignment of a particular flight associated with a digital content campaign (e.g., a variant of an experimentation, a particular message to be displayed in a user interface) to the client device 106. The client tool 108 may also facilitate the determination whether any actions should be performed with regard to the particular flight based on the flight assignment. Also, the client tool 108 may facilitate the performing of certain actions pertaining to the digital content campaign based on the flight assignment.

For example, a digital content campaign may be developed to motivate the users of an application, whose subscription to the application is about to expire, to renew their subscription. The application may or may not be associated with the digital content campaign. Some users may be motivated to renew their subscription if a particular, previously disabled feature of application is enabled in the application. The digital content campaign may include two flights: a first flight with an indication to enable a first feature, and a second flight with an indication to enable a second feature. In some example embodiments, the first flight is assigned to a first user segment (e.g., a first group of users whose subscription is about to expire), and the second flight is assigned to a second user segment (e.g., a second group of users whose subscription is about to expire).

The client tool 108 may communicate via network 104 with a service (e.g., flight assignment service 124) hosted by the networked system 102 to obtain a flight identifier for the client device 106. The flight identifier may indicate the name of the particular feature and whether the particular feature should be enabled in a product or service for use by the user associated with the client device 106. The client tool 108 may determine, based on the flight identifier, whether to enable the particular feature of the product or service for the client device 106 or not. If the client tool 108 determines, based on the flight identifier, that it should enable the particular feature, the client tool 108 enables the particular feature of the product or service for the client device 106. The client tool 108 may also track interactions by the user associated with the client device 106 with the particular feature, whether the user renews the user's subscription to the product or service, and how soon after the particular feature is enabled the user renews the user's subscription.

According to another example, a digital content campaign may be developed to test the responses of different groups of users of a product or service to different messages pertaining to the product or service. The digital content campaign may be associated with a first message to be sent to a first user segment of users of the product or service, and a second message to a second user segment of users of the product or service. A flight may be a particular message associated with the digital content campaign. A first flight may be assigned to the first user segment, and a second flight may be assigned to the second user segment by a user segment and digital content campaign service 126. The user segment and digital content campaign service 126 may be hosted by the networked system 102.

The client tool 108 may communicate via network 104 with the flight assignment service 124 hosted by the networked system 102 to obtain a flight identifier for the client device 106. The flight identifier may indicate whether a particular message should be displayed in a user interface of the client device 106. The flight identifier may also indicate that the client device 106 should send a request to the user segment and digital content campaign service 126 to determine whether the user associated with the client device 106 is included in a user segment for whom the particular message should be displayed. The client tool 108 may send a request, via the client device 106, to the user segment and digital content campaign service 126 to determine whether the user associated with the client device 106 is included in a user segment for whom the particular message should be displayed. A reply from the user segment and digital content campaign service 126 to the request may indicate whether the client device 106 (or a user associated with the client device 106) is included in the user segment for whom the particular message should be displayed.

Based on the reply from the user segment and digital content campaign service 126 to the request, the client tool 108 may determine whether to display the particular message in the user interface of the client device 106 or not. If the client tool 108 determines that it should display the particular message in the user interface of the client device 106, the client tool 108 may display the particular message in the user interface of the client device 106. In some example embodiments, application 112 may display the particular message in the user interface of the client device 106. The client tool 108 may also track interactions by the user associated with the client device 106 with the particular message (e.g., response to a call to action, delete the message, a timeliness of actions, etc.).

The client device 106 may host one or more databases e.g., database 110). The client tool 108 may access database 110 in order to store or access data pertaining to one or more flight assignments associated with client device 106, data pertaining to actions taken by the user of client device 106 based on one or more digital content campaigns, or both. The database 110 may also store records that include various data utilized by one or more applications 112, such as data pertaining to a feature of the application 112 that is to be enabled during a digital content campaign, and the time when such enabling is to occur.

In some example embodiments, one or more of the functionalities provided by the client tool 108 are provided by the application 112. While the application 112 is shown in FIG. 1 to be stored on the client device 106, it will be appreciated that, in alternative embodiments, the application 112 may be stored externally to the client device 106 (e.g., on a separate and distinct machine, such as a server of a cloud computing solution), and may take the form of software-as-a-service (SaaS).

In some example embodiments, an Application Program interface (API) server 114 and a web server 116 are coupled to, and provide programmatic and web interfaces respectively to, a flight assignment and segmentation server 118. In some example embodiments, the functions associated with the flight assignment and segmentation server 118 are performed by a plurality of servers.

In some example embodiments, the flight assignment and segmentation server 118 hosts the flight assignment service 124 and the user segment and digital content campaign service 126. In various example embodiments, the flight assignment service 124 and the user segment and digital content campaign service 126 are hosted on different servers that do not communicate with each other. In some example embodiments, the flight assignment service 124 and the user segment and digital content campaign service 126 are hosted on the same server.

The flight assignment service 124 may determine which flights of a digital content campaign should be assigned to which client devices of a plurality of client devices. The flight assignment service 124 may perform the flight assignment to client devices based on matching one or more targeting criteria associated with the digital content campaign with one or more data points associated with the client devices. Examples of the one or more data points associated with a client device are one or more characteristics of the client device (e.g., a type of client device (e.g., a tablet, a smart phone, a laptop, a smart watch, etc.), an operating system, a version identifier, etc.), one or more characteristics of a particular application hosted by the client devices (e.g., an application name, a version identifier, a platform identifier, etc.), and one or more characteristics of the user associated with the client device (e.g., age, gender, location, client devices associated with the user, whether the user utilizes a certain product or service, whether the user utilizes the product or service on a mobile device, frequency of using the product or service, etc.).

The user segment and digital content campaign service 126 may generate user segments of a user base of the application 112. The user segment may include client devices that are receivers of the digital content campaign. The generating of a user segment of the user base of the application may be based on the determining that the one or more characteristics of the application 112 match the one or more targeting criteria associated with the digital content campaign. The one or more targeting criteria associated with the digital content campaign may be stored in a record of the database 122.

The flight assignment and segmentation server 118 may be coupled to a database server 120 that facilitates access to a database 122. The database 122 may store records that include various data utilized by the flight assignment and segmentation server 118, such as data pertaining to digital content campaigns, flight assignments to client devices and/or to user segments, content items included in the digital content campaigns, targeting criteria associated with the digital content campaigns, characteristics of client devices and/or of users associated with the client device, experimentation data, tracking data pertaining to user interactions with the content delivered via client devices during the digital content campaigns, reports associated with the digital content campaigns, etc.

In some example embodiments, the client tool 106 communicates with accesses) the flight assignment and segmentation server 118 via the programmatic interface provided by the API server 114 or via the web interface supported by the web server 116. The web server 116 and/or the API server 114 may receive requests from the client device 106, and may communicate appropriate responses to the client device 106. For example, the web server 116 receives requests in the form of Hypertext Transport Protocol (HTTP) requests, or other web-based, application programming interface (API) requests. The client device 106 may be executing web browser applications and/or applications (also referred to as "apps") that have been developed for a specific platform to include any of a wide variety of mobile computing devices and mobile-specific operating systems (e.g., iOS™, Android™, Windows® Phone).

The client device 106 may provide functionality to present information to the user of the client device 106, and may communicate via the network 104 to exchange information with the networked system 102. The client device 106 may comprise a computing device that includes at least a display and communication capabilities to communicate with the network 104 to access the networked system 102. The client device 106 may comprise, but is not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users of the client device 106 may be a person, a machine, or other entity that interacts with the client device 106. The user may interact with the networked system 102 via the client device 106. The user may not be part of the networked environment, but may be associated with the client device 106.

Further, while the system 100 shown in FIG. 1 employs a client-server architecture, the present invention is of course not limited to such an architecture, and could equally well find application n a distributed, or peer-to-peer, architecture system, for example.

Figure 2:
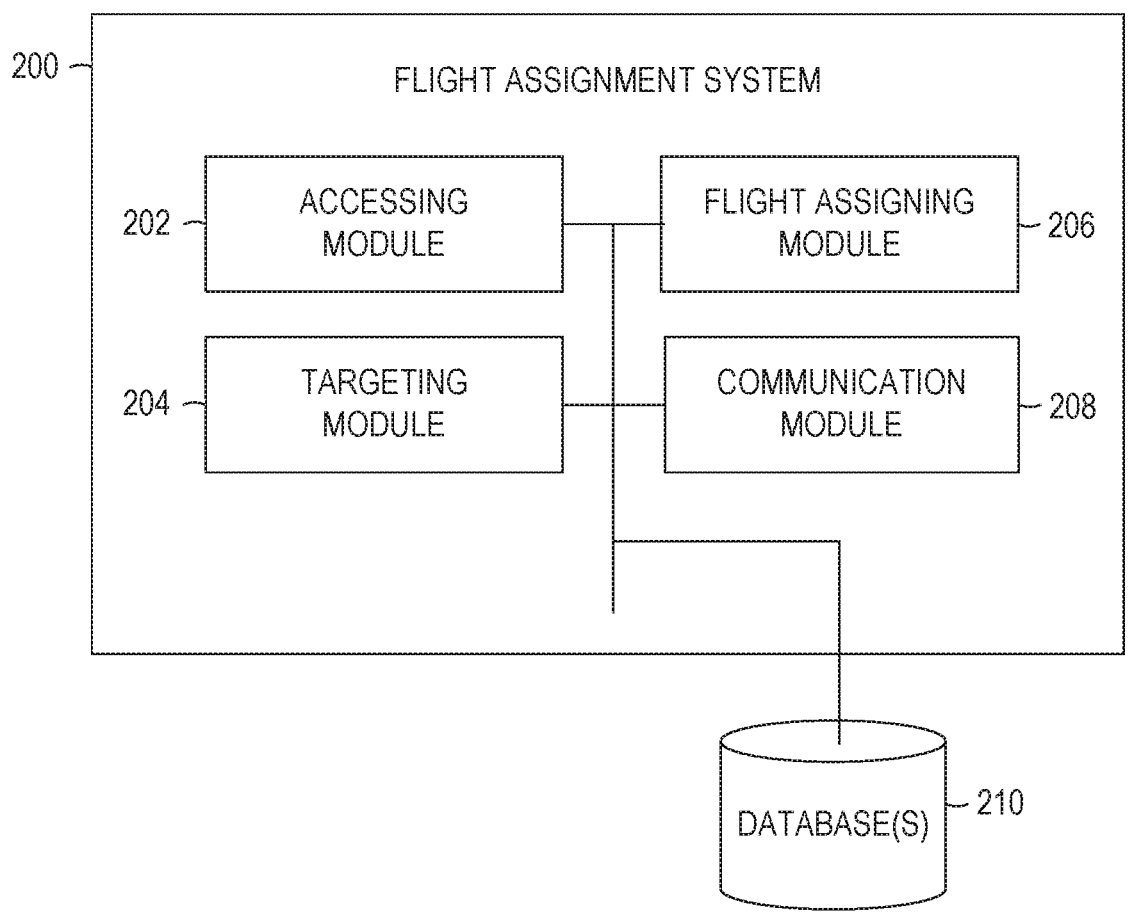
FIG. 2 is a block diagram illustrating components of a flight assignment and segmentation system, according to some example embodiments.

FIG. 2 is a block diagram illustrating components of a flight assignment and segmentation system 200, according to some example embodiments. The flight assignment and segmentation system 200 may be hosted on the flight assignment and segmentation server 118, or may be distributed among several servers. As shown in FIG. 2, the flight assignment and segmentation system 200 includes an accessing module 202, a targeting module 204, a flight assigning module 206, a communication module 208, and a user segment module 210, all configured to communicate with each other (e.g., via a bus, shared memory, or a switch).

According to some example embodiments, the accessing module 202 accesses data pertaining to one or more characteristics of an application. The application may be hosted on a client device. In some example embodiments, the data pertaining to one or more characteristics of the application may be stored at and accessed from a record of a database 210 (e.g., database 122). In various example embodiments, the data pertaining to one or more characteristics of the application is received from a client device (e.g., the client device 106).

The targeting module 204 may determine that the one or more characteristics of the application match one or more targeting criteria associated with a digital content campaign. The digital content campaign may include a plurality of flights of a digital content item. The flights may identify different variants (e.g., variations, versions, treatments in an A/B test, an enabled or disabled feature, etc.) of the digital content item. In some instances, a digital content is a feature of the application that may or may not be enabled in the application. In some instances, a digital content campaign may indicate whether or not a message is displayed when the application is running on the client device.

Examples of the one or more characteristics of the application include an application name, a version identifier, a platform identifier, a license expiration date, a subscription expiration date, etc. Example of the targeting criteria associated with a digital content campaign may include an application name, a version identifier, a platform identifier, a license expiration date, a subscription expiration date, etc.

The targeting module 204 may access the one or more characteristics of the application and the one or more targeting criteria associated with the digital content campaign from a record of the database 210. The matching of the one or more characteristics of the application and the one or more targeting criteria associated with the digital content campaign may include determining that at least a particular number of the targeting criteria associated with the digital content campaign are present among the one or more characteristics of the application.

The flight assigning module 206 assigns a flight of the plurality of flights of the digital content campaign to the client device. The flight may identify a variant (e.g., variation, version, treatment in an A/B test, etc.) of the digital content item.

For example, consider a digital content campaign that is an A/B experimentation. The digital content item may be a generic message "Would you like to renew?"), and the flights may be variations on the message (e.g., "Click to renew."). A purpose of the A/B experimentation may be to test the responses of two different groups of users to two variants of the message. The two groups of users may be assigned different treatments of the A/B experimentation, wherein each treatment is represented by a particular flight of the digital content campaign. The users' responses to the two different treatments may be tracked and compared to identify which of the two treatments is better at eliciting a desired response.

According to another example, a digital content campaign is a project to increase the number of subscriptions to a product or service, such as a software application, by enabling a previously disabled feature of the product or service when accessed by the client device. The digital content item may be a feature of the software application. A first flight of the digital campaign may be a command to enable the feature of the application when the application is running on a client device, and a second flight may be a command to disable (or not enable) the feature of the application when the application is running on a client device. The first flight may be assigned to a first user segment of the user base of the application. The first user segment may include the users whose subscription or the product or service is about to expire. The second flight may be assigned to a second user segment of the user base of the application. The second user segment may include the users whose subscription or the product or service is not going to expire for a while. The flight assignment and segmentation system 200 may track whether users whose client devices received the first flight renewed their subscription or not.

The communication module 208 may transmit a communication to the client device via a network. The communication may include a flight identifier associated with the flight.

The user segment module 210 may generate a user segment of a user base of the application. The user segment may include client devices that are receivers of the digital content campaign. In some instances, the generating of the user segment is based on the determining that the one or more characteristics of the application match the one or more targeting criteria associated with the digital content campaign. In some instances, the generating of the user segment is based on the determining that one or more characteristics of the client device e.g., an operating system of the client device) match the one or more targeting criteria associated with the digital content campaign. In some instances, the generating of the user segment is based on the determining that one or more characteristics of a user associated with the application (or with the client device) match the one or more targeting criteria associated with the digital content campaign. In some instances, the user segment includes the client device. In some instances, the user segment includes a user associated with the client device.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 210 (e.g., database 122 or database 110). The functions of the modules are discussed in more detail below.

Figure 3:
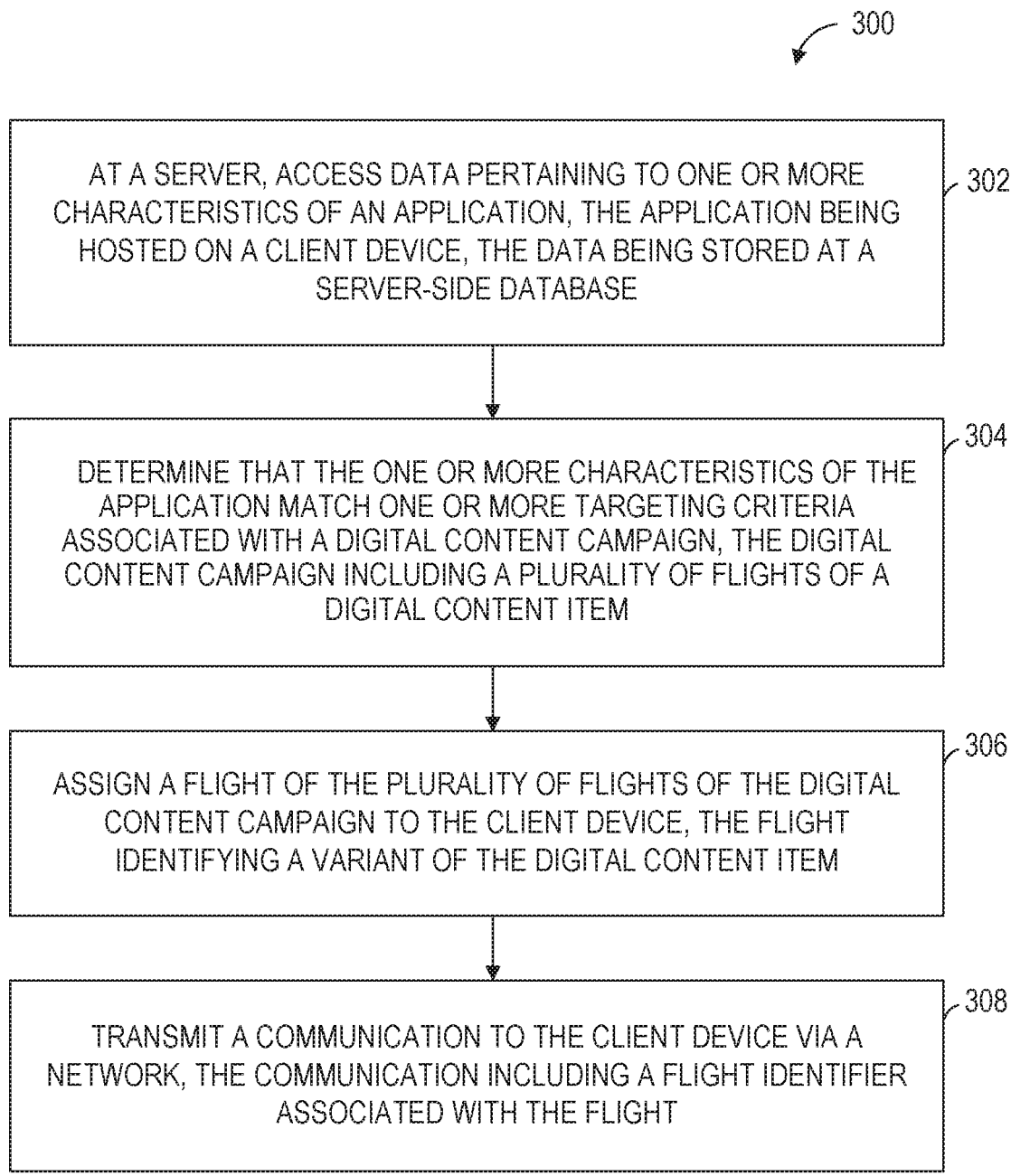
FIGS. 3-7 are flowcharts illustrating methods for server-side assignment of digital content campaign treatments to targets of a digital content campaign, according to some example embodiments.

FIGS. 3-9 are flowcharts illustrating a method for server-side assigning of digital content campaign treatments to targets of a digital content campaign, according to some example embodiments. Operations in the method 300 illustrated in FIG. 3 (as well as FIGS. 4-7) may be performed using modules described above with respect to FIG. 2 or by executing, using at least one hardware processor, computer-readable instructions stored on a storage device. As shown in FIG. 3, method 300 may include one or more of operations 302, 304, 306, and 308, according to some example embodiments.

At operation 302, at a server, data pertaining to one or more characteristics of an application is accessed. For example, the accessing module 202 hosted on a server of the flight assignment and segmentation system accesses the data pertaining to the one or more characteristics of an application. The application may be hosted on a client device. In some example embodiments, the data pertaining to the one or more characteristics of the application includes at least one of a type of the application, a frequency of use, by a user associated with the client device, of one or more features of the application on one or more client devices including the client device, or a lack of use of the one or more features of the application on the one or more client devices including the client device.

In some example embodiments, the data pertaining to one or more characteristics of the application may be stored at and accessed from a record of a database 210 (e.g., database 122). In various example embodiments, at least some of the data pertaining to one or more characteristics of the application is received from a client device (e.g., the client device 106). In some instances, the data pertaining to the one or more characteristics of the application is received from a plurality of client devices including the client device 106. For example, a user associated with the client device 106 may use a first version of application ABC hosted on the user's personal laptop. The user may also use a second version of the application ABC hosted on the user's work laptop. The user may also use a third version of the application ABC hosted on the user's smart phone. The data pertaining to the one or more characteristics of the application may include data about one or more characteristics of the first, second, and third versions of the application ABC, such as the features of the application ABC used by the user in the various versions of the application ABC. The data pertaining to the one or more characteristics of the application may be aggregated, e.g., by the flight assignment and segmentation system 200 or by a different system, from the different client devices associated with the user, and may be stored on a cloud-side (e.g., server-side) database.

At operation 304, the one or more characteristics of the application are determined to match one or more targeting criteria associated with a digital content campaign. The digital content campaign may include a plurality of flights of a digital content item. A flight may represent (e.g., correspond to) a variant or variation of the digital content item. Examples of a digital content item are a message, a feature of an application, the content of a web page, etc.

At operation 306, a flight of the plurality of flights of the digital content campaign is assigned to the client device. The flight may identify a particular variant of the digital content item. The assigning of the flight to the client device may include associating the flight with a client device identifier in a record of a database (e.g., the database 210).

At operation 308, a communication is transmitted to the client device via a network. The communication may be transmitted from the flight assignment and segmentation system 200 (e.g., the flight assignment and segmentation server 118). The communication may include a flight identifier associated with the flight. According to certain example embodiments, the communication to the client device further includes the flight associated with the flight identifier.

In some example embodiments, the flight identifier includes an alphanumeric string that uniquely identifies a particular flight associated with a digital content campaign. In some instances, the alphanumeric string may be generated, by the flight assignment and segmentation system 200, based on applying a hashing function to an identifier (e.g., the name) of a digital content item, such as a feature of a software application. According to some example embodiments, the result of applying a hash function to a feature identifier is a twelve-character alphanumeric string. Based on the twelve-character alphanumeric string, a flight identifier is generated to uniquely identify the flight corresponding to the feature. The flight identifier is another (e.g., a composite) alphanumeric string that may take the following format:

id+a twelve-character string+(the last digit of the composite string is a "0," a "1," a "2," or a "3").

Where "id" is an identifier that is attached at the beginning of every flight identifier that is associated with a particular product (e.g., "id" may be "ab" for an application "ApplicationABC"); the "twelve-character string" is a twelve-character alphanumeric string which is the result of applying the hash function (or algorithm) to the feature identifier; and the last character of the flight identifier may take a value of "0," a "1," a "2," or a "3," where the value "0" may mean that this is a flight with an indexed treatment. For example, in the code of the software application, a developer can define the possible variants (or values) for a particular feature. The code may include a code line that states: FeatureGate("Application_Suit.ApplicationABC.BackgroundColor", "white"/default value*/, {"red", "blue", "green", "yellow"}/*possible values*/), "white" being the default value, and "red", "blue", "green", and "yellow" being possible values for background colors associated with application "ApplicationABC," and "red" being associated with the value "1," "blue" being associated with the value "2," "green" being associated with the value "3," and "yellow" being associated with the value "4."

The client device (e.g., a client tool, a client application, etc.) may receive a communication from the flight assignment system 200 (e.g., the flight assignment service 124). The communication may include the flight identifier "ab61eae3mzzux40" and the value "3." Here, the last character "0" of the flight identifier indicates that the value "3" is an index into the possible values. This will set the background color to "green."

As mentioned above, the last character of the flight identifier may take a value of "0," a "1," a "2" or a "3," where the value "1" may mean that the flight is a flight with value treatment. In the same example as above, the developer may specify the FeatureGate name but not the possible values: FeatureGate("Application_Suit.ApplicationABC.BackgroundColor"). The communication from the flight assignment system 200 to the client device may include the flight identifier "ab61eae3mzzux41" and the value "green." Here the last character "1" of the flight identifier indicates that the value "green" is the absolute value. That value is used for the background color of the application.

As mentioned above, the last character of the flight identifier may take a value of "0," a "1," a "2," or a "3," where the value "2" may mean that the flight is a deferred indexed treatment. The client device may receive a communication from the flight assignment system 200 (e.g., the flight assignment service 124). The communication may include the flight identifier "ab61eae3mzzux42" and the value "3." Here the last character "2" of the flight identifier indicates that the client device should send this flight identifier to the User Segment and Digital Content Campaign Service to determine whether the user associated with the client device the client device is included in the user segment.

Based on identifying the value "2" as the last character of the flight identifier, the client device transmits a communication (e.g., a query) including the flight identifier "ab61eae3mzzux42" to the User Segment and Digital Content Campaign Service 126 to determine whether the user associated with the client device (or the client device) belongs to a user segment.

Based on the flight identifier, the User Segment and Digital Content Campaign Service 126 determines whether the user associated with the client device (or the client device) is included in the user segment, and replies to the communication from the client device. If, based on the reply, the client device determines that the user (or the client device) is included in the user segment, then the client device honors the value (e.g., value "3"), and displays a green background. If, based on the reply, the client device determines that the user (or the client device) is not included in the user segment, then the client device applies the default value (e.g., a white background).

As mentioned above, the last character of the flight identifier may take a value of "0," a "1," a "2," or a "3," where the value "3" may mean that the flight is a deferred value treatment. The developer may specify the FeatureGate name but not the possible values: FeatureGate("Application_Suit.ApplicationABC.BackgroundColor"). The communication from the flight assignment system 200 to the client device may include the flight identifier "ab61eae3mzzux43" and the value "green." Here the last character "3" of the flight identifier indicates that the client device should send this flight identifier to the User Segment and Digital Content Campaign Service to determine whether the user associated with the client device the client device) is included in the user segment.

Based on identifying the value "3" as the last character of the flight identifier, the client device transmits a communication (e.g., a query) including the flight identifier "ab61eae3mzzux43" to the User Segment and Digital Content Campaign Service 126 to determine whether the user associated with the client device (or the client device) belongs to the user segment. Based on the flight identifier, the User Segment and Digital Content Campaign Service 126 determines whether the user associated with the client device (or the client device) is included in the user segment, and replies to the communication from the client device. If, based on the reply, the client device determines that the user (or the client device) is included in the user segment, then the client device honors the value (e.g., value "green"), and displays a green background. If, based on the reply, the client device determines that the user (or the client device) is not included in the user segment, then the client device applies the default value (e.g., a white background).

Further details with respect to the method operations of the method 300 are described below with respect to FIGS. 4-7.

Figure 4:
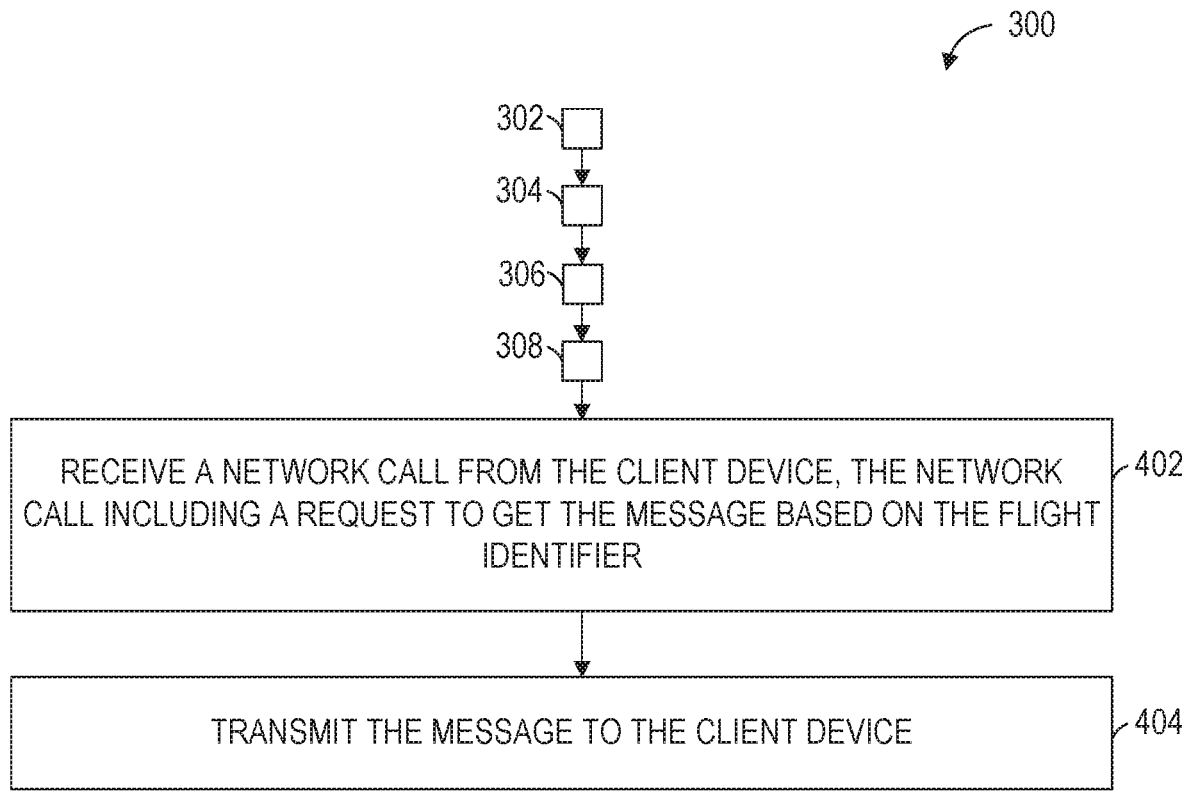

As shown in FIG. 4, the method 300 may include one or more of method operations 402 or 404, according to some example embodiments. In some example embodiments, the digital content item includes a message for display in a user interface associated with the application, and the flight identifier indicates that the message should be displayed in the user interface. For example, to indicate that the message should be displayed in the user interface, the flight identifier may include a treatment indicator, such as a "1," as the value of a reserved character in the flight identifier (e.g., at the end of an alphanumeric string that is the flight identifier).

Operation 402 may be performed after operation 308 of FIG. 3, in which a communication is transmitted to the client device via the network, the communication including a flight identifier associated with the flight. At operation 402, a network call may be received from the client device. The network call may be received at the flight assignment and segmentation system 200 based on (e.g., in response to) the communication to the client device. The network call may include a request to get the message based on the flight identifier.

At operation 404, in response to the network call, the message is transmitted to the client device.

In some example embodiments, a user response to the message is tracked via the client device. For example, the flight assignment and segmentation system may access (e.g., receive) a log that stores data pertaining to interactions by the user of the client device with the application in response to the message being transmitted to the client device.

Figure 5:
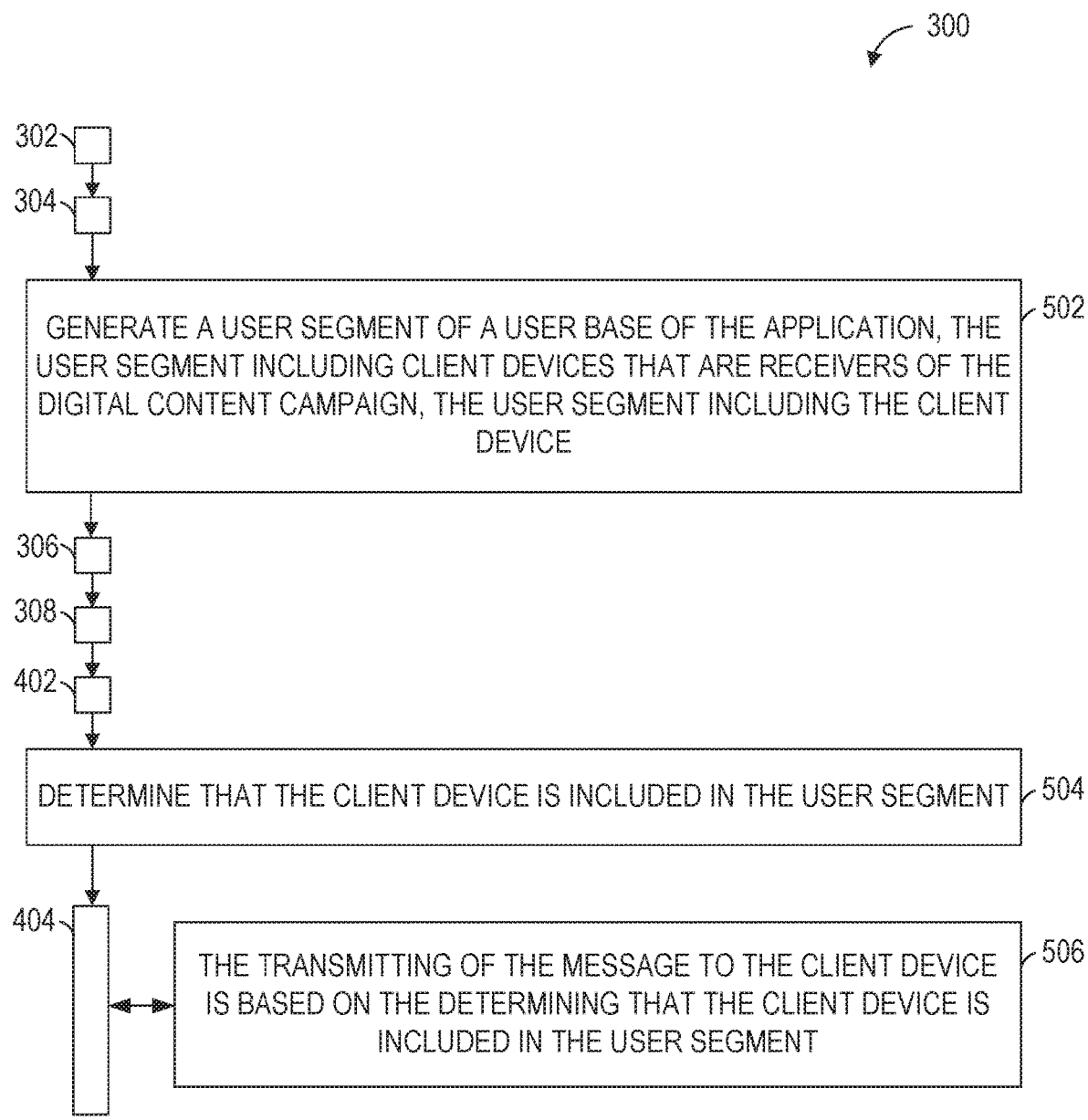

As shown in FIG. 5, the method 300 may include one or more method operations 502, 504, or 506, according to some example embodiments. Operation 502 may be performed after operation 304 of FIG. 4, in which the one or more characteristics of the application are determined to match one or more targeting criteria associated with a digital content campaign.

At operation 502, a user segment of a user base of the application is generated. The user segment may include client devices that are receivers of the digital content campaign. The generating of the user segment may be based on the determining that the one or more characteristics of the application match the one or more targeting criteria associated with the digital content campaign. The user segment includes the client device.

For example, the client device (e.g., a first client device) may be included in the user segment based on the determination that the one or more characteristics of the application hosted on the client device match the one or more targeting criteria associated with the digital content campaign. Similarly, another client device (e.g., a second client device) may be included in the user segment based on the determination that the one or more characteristics of the application hosted on the second client device match the one or more targeting criteria associated with the digital content campaign.

Operation 504 may be performed after operation 402 of FIG. 4, in which a network call may be received from the client device. The network call may include a request to get the message based on the flight identifier.

At operation 504, based on the network call, a determination is made that the client device is included in the user segment. The determination may be made by the flight assignment and segmentation system 200 based on accessing a database record that indicates an association between a client device identifier and a user segment identifier.

Operation 506 may be performed as part (e.g., a precursor task, a subroutine, or a portion) of operation 404 of FIG. 4, in which, in response to the network call, the message is transmitted to the client device. At operation 506, the transmitting of the message to the client device is based on the determining that the client device is included in the user segment.

For example, if the flight assignment and segmentation system 200 determines that the client device is included in the user segment, the flight assignment and segmentation system 200 transmits the message to the client device based on (e.g., in response to) network call. If the flight assignment and segmentation system 200 determines that the client device is not included in the user segment, the flight assignment and segmentation system 200 does not transmit the message to the client device.

Figure 6:
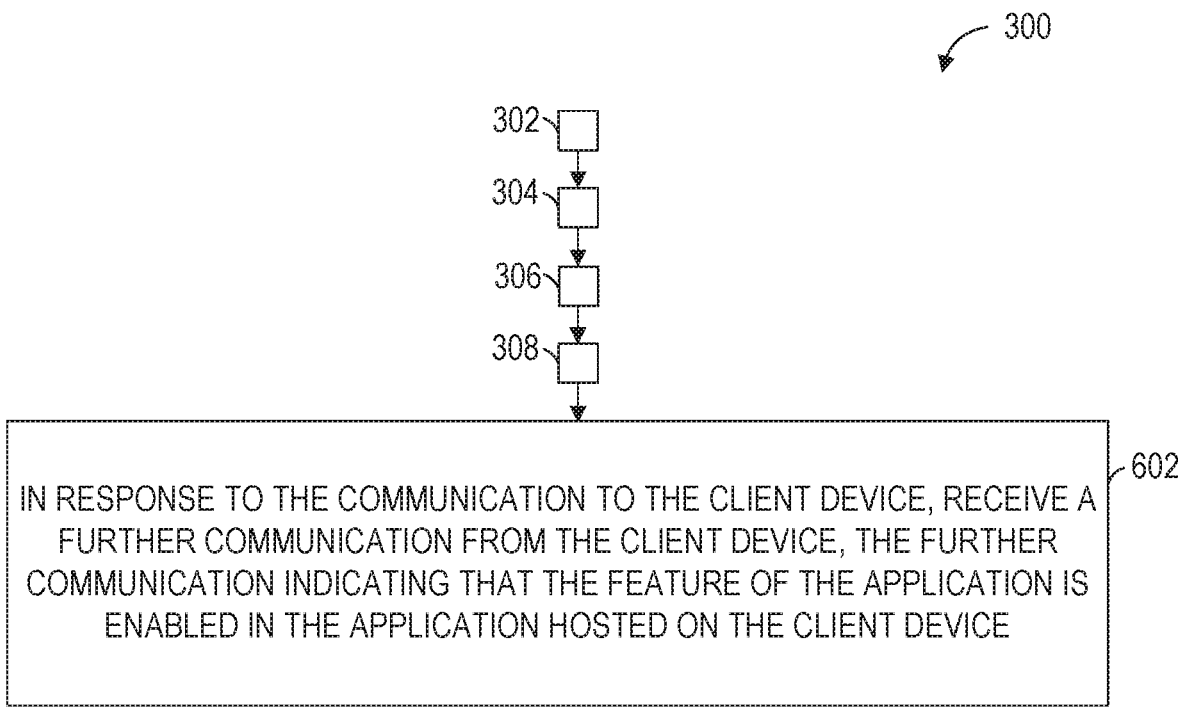

As shown in FIG. 6, the method 300 may include method operation 602, according to some example embodiments. In some example embodiments, the digital content item includes a feature of the application, and the flight identifier indicates that the feature should be enabled in the application at run time of the application.

Operation 602 may be performed after operation 308 of FIG. 3, in which a communication is transmitted to the client device via the network, the communication including a flight identifier associated with the flight. At operation 602, a second communication (e.g., another communication, a further communication, etc.) is received from the client device. The second communication may be received at the flight assignment and segmentation system 200 in response to the communication to the client device. The second communication may indicate that the feature of the application is enabled in the application hosted on the client device.

Figure 7:
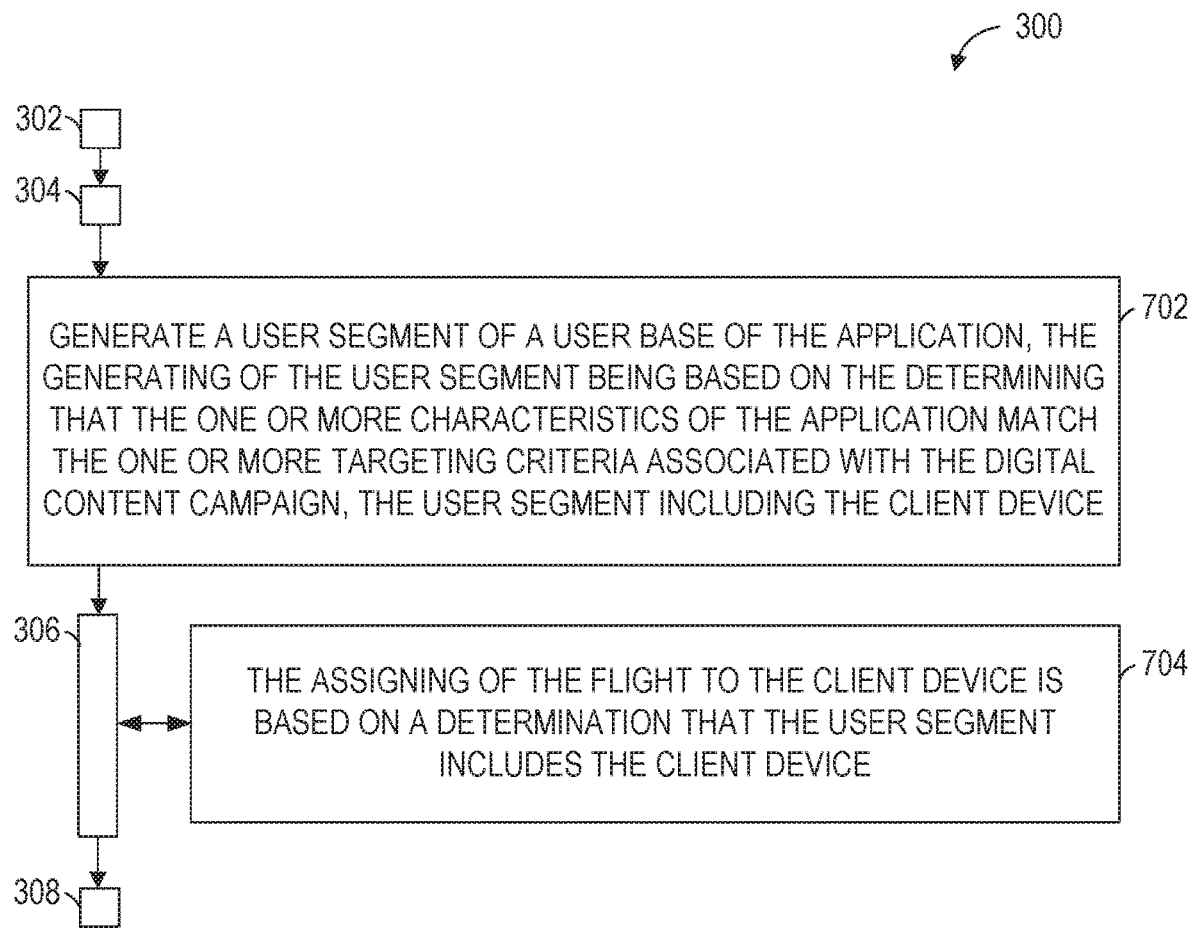

As shown in FIG. 7, the method 300 may include operations 702 or 704, according to some example embodiments. Operation 702 may be performed after operation 304 of FIG. 3, in which the one or more characteristics of the application are determined to match one or more targeting criteria associated with a digital content campaign.

At operation 702, a user segment of a user base of the application is generated. The generating of the user segment may be based on the determining that the one or more characteristics of the application match the one or more targeting criteria associated with the digital content campaign. The user segment includes the client device.

Operation 704 may be performed as part (e.g., a precursor task, a subroutine, or a portion) of operation 306 of FIG. 3, in which a flight of the plurality of flights of the digital content campaign is assigned to the client device. The flight may identify a particular variant of the digital content item.

At operation 704, the assigning of the flight to the client device is based on a determination that the user segment includes the client device.

Figure 8:
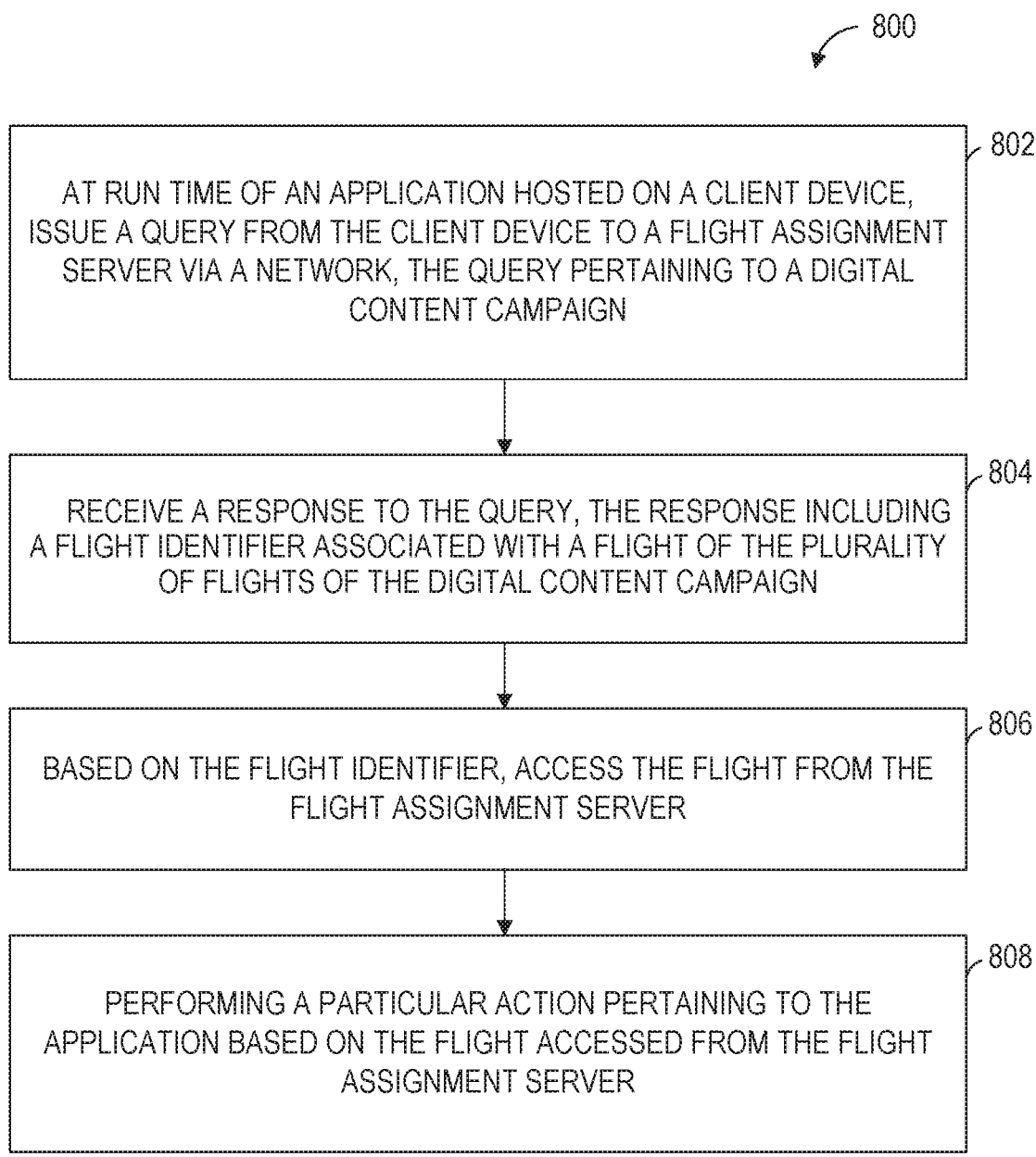
FIG. 8 is a flowchart illustrating a method for identifying a flight assigned to a client device and for performing an action pertaining to an application hosted on the client device based on the flight.

As shown in FIG. 8, the method 800 may include one or more operations 802, 804, 806, or 808, according to some example embodiments. At operation 802, at run time of an application hosted on a client device, a query is issued from the client device to a flight assignment and segmentation server via a network. The query pertains to a digital content campaign. The digital content campaign includes a plurality of flights of a digital content item.

At operation 804, a response to the query is received from the flight assignment and segmentation server. The response may include a flight identifier associated with a flight of the plurality of flights of the digital content item.

At operation 806, the flight is accessed from flight assignment and segmentation server. The flight assignment and segmentation server may store flights of the digital content item. The accessing of the flight may be based on the flight identifier.

At operation 808, a particular action pertaining to the application is performed based on the flight accessed from the server.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electric Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

EXAMPLE MACHINE ARCHITECTURE AND MACHINE-READABLE MEDIUM

Figure 9:
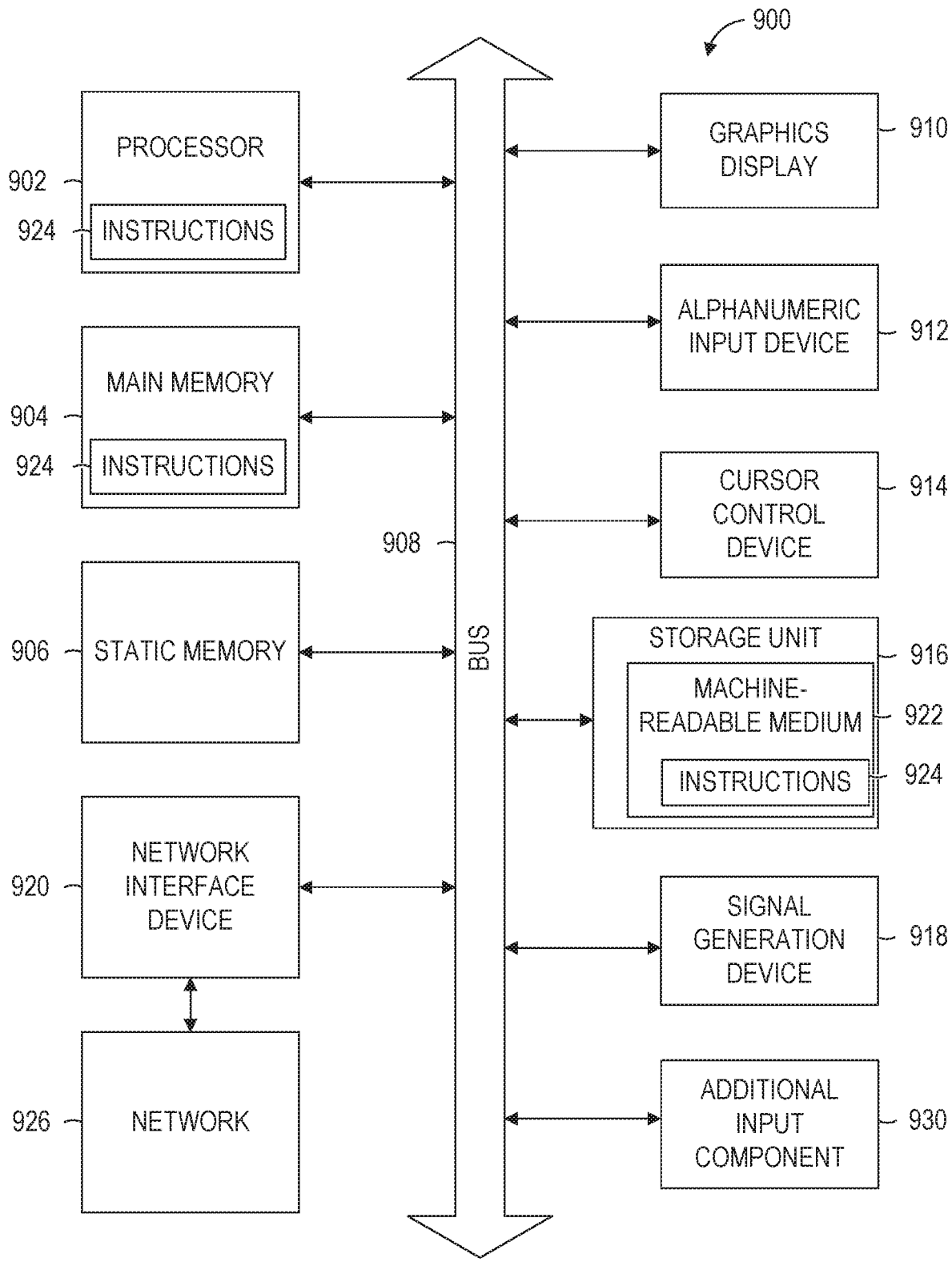
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 926 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" may be a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

at a server, accessing data pertaining to one or more characteristics of an application, the application being hosted on a client device, the data being stored at a server-side database;

determining that the one or more characteristics of the application match one or more targeting criteria associated with a digital content campaign, the digital content campaign including a plurality of flights of a digital content item, the digital content item comprising a feature of the application;

assigning a flight of the plurality of flights of the digital content campaign to the client device, the flight identifying a variant of the feature of the application, wherein a first variant of the digital content item includes a first feature of the application, wherein a first flight identifier indicates that the first feature is to be enabled in the application at run time of the application on a first client device, the first client device indicating that the first feature of the application is enabled in the application hosted on the first client device after receiving the first flight identifier from the server, wherein a second variant of the digital content item includes a second feature of the application, and wherein a second flight identifier indicates that the second feature is to be enabled in the application at run time of the application on a second client device, the second client device indicating that the second feature of the application is enabled in the application hosted on the second client device after receiving the second flight identifier from the server; and transmitting a communication to the client device via a network, the communication including a flight identifier associated with the flight, the flight identifier instructing the application to enable the variant of the feature of the application at run time of the application on the client device.

2. The method of claim 1, wherein the digital content item includes a message for display in a user interface associated with the application, and wherein the flight identifier indicates that the message should be displayed in the user interface, the method further comprising:
receiving a network call from the client device, the network call including a request to get the message based on the flight identifier; and
based on the network call, transmitting the message to the client device.

3. The method of claim 2, further comprising:
tracking a user response to the message based on accessing a log that stores data pertaining to interactions by a user of the client device with the application in response to the message being transmitted to the client device.

4. The method of claim 2, further comprising:
generating a user segment of a user base of the application, the user segment including client devices that are receivers of the digital content campaign, the generating of the user segment being based on the determining that the one or more characteristics of the application match the one or more targeting criteria associated with the digital content campaign, the user segment including the client device; and
based on the network call, determining that the client device is included in the user segment, wherein the transmitting of the message to the client device is further based on the determining that the client device is included in the user segment.

5. The method of claim 1, wherein the communication to the client device further includes the flight associated with the flight identifier.

6. The method of claim 1, further comprising:
generating a user segment of a user base of the application, the generating of the user segment being based on the determining that the one or more characteristics of the application match the one or more targeting criteria associated with the digital content campaign, the user segment including the client device,
wherein the assigning of the flight to the client device is based on a determination that the user segment includes the client device.

7. A system comprising:
one or more hardware processors; and
a machine-readable medium storing instructions which, when executed by the one or more hardware processors, cause the one or more hardware processors to perform operations comprising:
at a server, accessing data pertaining to one or more characteristics of an application, the application being hosted on a client device, the data being stored at a server-side database;
determining that the one or more characteristics of the application match one or more targeting criteria associated with a digital content campaign, the digital content campaign including a plurality of flights of a digital content item, the digital content item comprising a feature of the application;
assigning a flight of the plurality of flights of the digital content campaign to the client device, the flight identifying a variant of the feature of the application,
wherein a first variant of the digital content item includes a first feature of the application, wherein a first flight identifier indicates that the first feature is to be enabled in the application at run time of the application on a first client device, the first client device indicating that the first feature of the application is enabled in the application hosted on the first client device after receiving the first flight identifier from the server,
wherein a second variant of the digital content item includes a second feature of the application, and wherein a second flight identifier indicates that the second feature is to be enabled in the application at run time of the application on a second client device, the second client device indicating that the second feature of the application is enabled in the application hosted on the second client device after receiving the second flight identifier from the server; and
transmitting a communication to the client device via a network, the communication including a flight identifier associated with the flight, the flight identifier instructing the application to enable the variant of the feature of the application at run time of the application on the client device.

8. The system of claim 7, wherein the digital content item includes a message for display in a user interface associated with the application, wherein the flight identifier indicates that the message should be displayed in the user interface, and wherein the operations further comprise:
receiving a network call from the client device, the network call including a request to get the message based on the flight identifier; and
based on the network call, transmitting the message to the client device.

9. The system of claim 8, wherein the operations further comprise:
tracking a user response to the message based on accessing a log that stores data pertaining to interactions by a user of the client device with the application in response to the message being transmitted to the client device.

10. The system of claim 8, wherein the operations further comprise:
generating a user segment of a user base of the application, the user segment including client devices that are receivers of the digital content campaign, the generating of the user segment being based on the determining that the one or more characteristics of the application match the one or more targeting criteria associated with the digital content campaign, the user segment including the client device; and
based on the network call, determining that the client device is included in the user segment,
wherein the transmitting of the message to the client device is further based on the determining that the client device is included in the user segment.

11. The system of claim 7, wherein the communication to the client device further includes the flight associated with the flight identifier.

12. The system of claim 7, wherein the operations further comprise:
generating a user segment of a user base of the application, the generating of the user segment being based on the determining that the one or more characteristics of the application match the one or more targeting criteria associated with the digital content campaign, the user segment including the client device,
wherein the assigning of the flight to the client device is based on a determination that the user segment includes the client device.

13. A non-transitory machine-readable storage medium comprising instructions that, when executed by one or more hardware processors of a machine, cause the one or more hardware processors to perform operations comprising:
at a server, accessing data pertaining to one or more characteristics of an application, the application being hosted on a client device, the data being stored at a server-side database;
determining that the one or more characteristics of the application match one or more targeting criteria associated with a digital content campaign, the digital content campaign including a plurality of flights of a digital content item, the digital content item comprising a feature of the application;
assigning a flight of the plurality of flights of the digital content campaign to the client device, the flight identifying a variant of the feature of the application,
wherein a first variant of the digital content item includes a first feature of the application, wherein a first flight identifier indicates that the first feature is to be enabled in the application at run time of the application on a first client device, the first client device indicating that the first feature of the application is enabled in the application hosted on the first client device after receiving the first flight identifier from the server,
wherein a second variant of the digital content item includes a second feature of the application, and wherein a second flight identifier indicates that the second feature is to be enabled in the application at run time of the application on a second client device, the second client device indicating that the second feature of the application is enabled in the application hosted on the second client device after receiving the second flight identifier from the server; and
transmitting a communication to the client device via a network, the communication including a flight identifier associated with the flight, the flight identifier instructing the application to enable the variant of the feature of the application at run time of the application on the client device.

14. The non-transitory machine-readable storage medium of claim 13, wherein the digital content item includes a message for display in a user interface associated with the application, wherein the flight identifier indicates that the message should be displayed in the user interface, and
wherein the operations further comprise:
receiving a network call from the client device, the network call including a request to get the message based on the flight identifier; and
based on the network call, transmitting the message to the client device.

15. The non-transitory machine-readable storage medium of claim 14, wherein the operations further comprise:
generating a user segment of a user base of the application, the user segment including client devices that are receivers of the digital content campaign, the generating of the user segment being based on the determining that the one or more characteristics of the application match the one or more targeting criteria associated with the digital content campaign, the user segment including the client device; and
based on the network call, determining that the client device is included in the user segment,
wherein the transmitting of the message to the client device is further based on the determining that the client device is included in the user segment.

16. The non-transitory machine-readable storage medium of claim 13, wherein the communication to the client device further includes the flight associated with the flight identifier.

17. The non-transitory machine-readable storage medium of claim 13, wherein the operations further comprise:
generating a user segment of a user base of the application, the generating of the user segment being based on the determining that the one or more characteristics of the application match the one or more targeting criteria associated with the digital content campaign, the user segment including the client device,
wherein the assigning of the flight to the client device is based on a determination that the user segment includes the client device.

* * * * *